Dec. 18, 1951  M. S. CURTIS ET AL  2,579,368
MACHINE TOOL
Filed July 18, 1946    7 Sheets-Sheet 1

INVENTORS
MYRON S. CURTIS
HARRY SCHOEPE
BY
Kwis, Hudson, Boughton & Williams
ATTORNEYS

INVENTORS
Myron S. Curtis
Harry Schoepe

Dec. 18, 1951   M. S. CURTIS ET AL   2,579,368
MACHINE TOOL
Filed July 18, 1946   7 Sheets-Sheet 5

Fig. 11

INVENTORS
MYRON S. CURTIS
HARRY SCHOEPE
BY
ATTORNEYS

Dec. 18, 1951  M. S. CURTIS ET AL  2,579,368
MACHINE TOOL

Filed July 18, 1946  7 Sheets-Sheet 6

INVENTORS
Myron S. Curtis
Harry Schoepe
BY
Kwis, Hudson, Boughton+Williams
ATTORNEYS Patented Dec. 18, 1951

2,579,368

UNITED STATES PATENT OFFICE 2,579,368

MACHINE TOOL

Myron S. Curtis and Harry Schoepe, Cleveland, Ohio, assignors to The Warner & Swasey Company, Cleveland, Ohio, a corporation of Ohio Application July 18, 1946, Serial No. 684,595

20 Claims. (Cl. 29—50)

This invention relates to a machine tool; in particular, to a machine tool having a tool (or work) support which is both indexible and reciprocable relative to a rotatable work (or tool) supporting spindle.

It is an object of this invention to provide a machine tool with an improved means for indexing and reciprocating a tool support thereof whereby these operations may be effected by a single source of power under electrical control.

Another object of the invention is to provide an improved machine tool having an indexible and reciprocable tool (or work) support with an improved power transmission means, employing electromagnetic elements for selectively controlling the said transmission means, to produce either indexing or reciprocation of said tool support by a single source of power.

Another object of the invention is to provide an improved power transmission unit for a machine tool comprising a driving member, two driven members, electromagnetic means for selectively operating either of said driven members by said driving member, and an electric circuit for selective energization of the electromagnetic means, the said circuit including means for preventing operation of the other of said driven members when one of said members is in operation.

An additional object of the invention is to provide a machine tool, having an indexible and reciprocable tool support, with an improved, electrically controlled, power transmission unit driven by a reversible motor for actuating said tool support, the electrical circuit for said motor and transmission unit having means to automatically terminate indexing and reciprocation of the tool support.

A further object of the invention is to provide an improved power transmission unit for a machine tool, the said unit comprising a driving and two driven members interconnected by epicyclic gearing, and a pair of electromagnetic elements cooperating with the epicyclic gearing to selectively effect driving of either of said driven members by said driving member.

A still further object of the invention is to provide an improved power transmission unit for a machine tool, the said unit comprising a driving member and two members to be driven thereby, and electromagnetically operated clutches and brakes so associated with said members that the driving member may be clutched to either one of the said driven members and the other of the driven members will be simultaneously held against rotation.

A still further object of the invention is to provide an improved machine tool having an indexible and reciprocable work or tool support wherein the said support carries both the means to reciprocate and the means to index the support.

It is also an object of the invention to provide a machine tool with an improved reciprocable and indexible tool support wherein the means for indexing the said support is automatically engaged at one extremity of the reciprocating movement of the said support, and is disengaged at all other points in the reciprocating movement.

Other objects and advantages of the invention will become apparent from the following detailed description taken in conjunction with the accompanying drawings illustrating certain preferred embodiments of the invention and wherein:

Figs. 12 and 12A are wiring diagrams of the electrical circuit for the motor and power transmission unit illustrated in Fig. 11, Fig. 12 being drawn in accordance with the practices of the machine tool industry while Fig. 12A is the same circuit drawn in accordance with the requirements of the Patent Office;

Figs. 14 and 14A are wiring diagrams of the electrical circuit for the motor and transmission unit of Fig. 13, Fig. 14 being drawn in accordance with the practices of the machine tool industry while Fig. 14A is the same circuit drawn in accordance with the requirements of the Patent Office.

Figures 1, 1A:
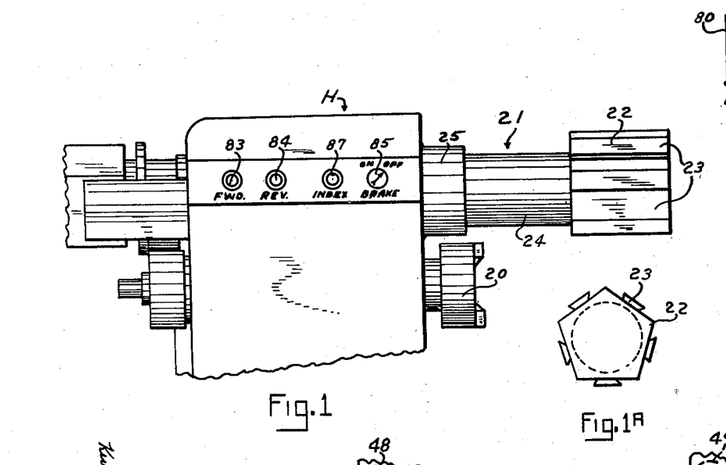
Fig. 1 is a partial front elevational view of a machine tool illustrating the relative positions of the work (or tool) holding spindle, and of the indexible and reciprocable tool (or work) support.
Fig. 1A is an end elevational view of the work (or tool) supporting head illustrated in Fig. 1.

In Fig. 1 of the drawings there is illustrated a portion of the headstock of a machine tool, generally designated H, in which is journalled a work (or tool) spindle 20 driven in the conventional manner (not here illustrated). Disposed in parallel relationship with the spindle 20 is a tool (or work) support, designated generally 21, which is mounted in the headstock H for both reciprocating and indexing motions. The outer end of this tool (or work) support 21 is provided with a multiple sided tool (or work) supporting head, generally designated 22. In the illustrated embodiment, the head 22 is provided with five faces on each of which is provided a dovetail projection 23, upon which a tool (or workpiece) may be mounted. While five such mounting means have been illustrated, it will be readily apparent that the number may be varied as desired. The tool (or work) support 21 further comprises a shaft 24, upon the outer end of which the tool (or work) supporting head 22 is mounted, the said shaft being reciprocably and rotatably journalled in the head H by bosses 25 and 26 .

Figure 2:
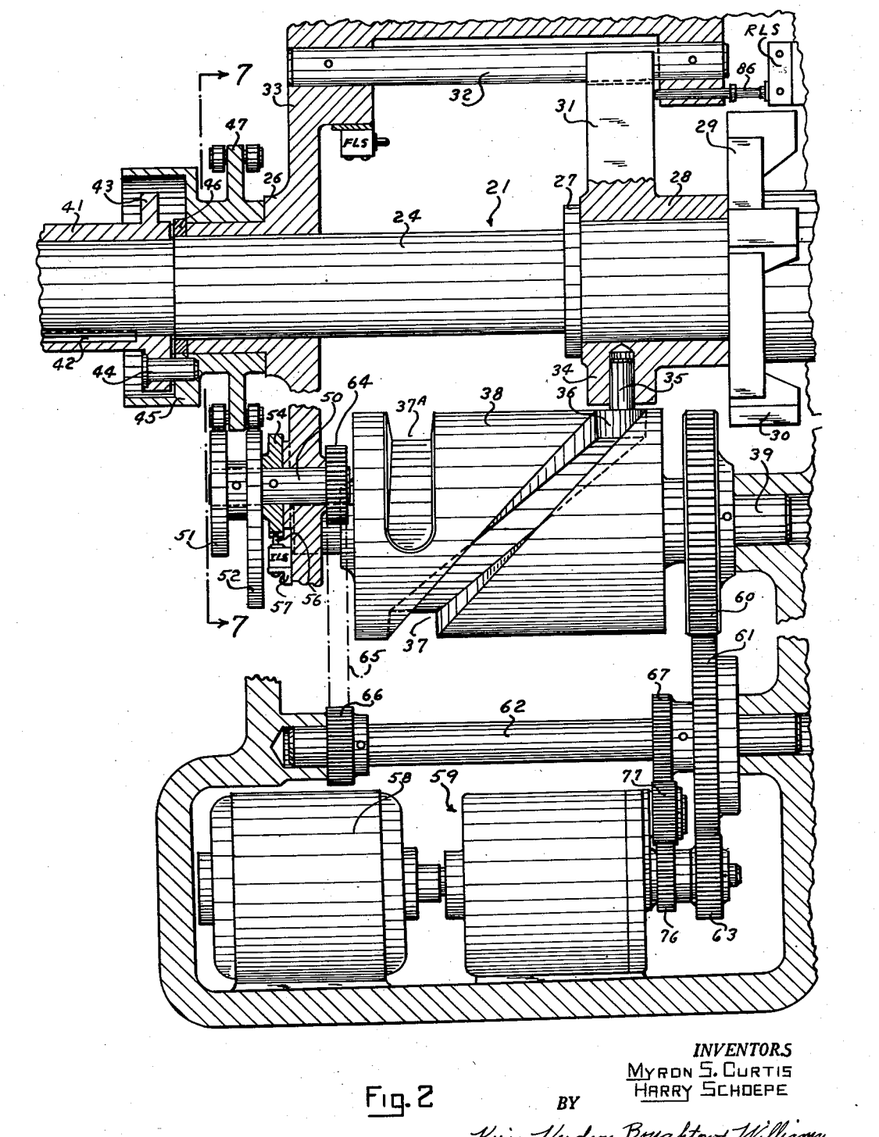
Fig. 2 is a sectional view taken substantially on the line 2—2 of Fig. 5 and further including a section through the housing for the driving means, the scale being enlarged relative to that employed in Fig. 1.

Turning now to Fig. 2, it will be seen that the shaft 24 is provided intermediate its ends with a shoulder 27, against which, and surrounding the shaft, is mounted a motion transmitting member 28. This member is retained against the shoulder 27 by means of a spider member 29 having a plurality of projecting lugs 30 thereon corresponding in number and spacing with the faces 23 on the tool (or work) head 22, the spider being fixedly mounted upon the shaft 24 for rotation therewith. The motion transmitting member 28 is provided with an outwardly extending arm 31 having a forked outer end straddling a guide bar 32 which is fixedly mounted in the framework 33 of the headstock H. The motion transmitting member 28 is further provided with a boss 34 in which is rotatably mounted a pin or stud 35 having a roller 36 on its outer end, the said roller being received in a cam groove 37 provided in a cylindrical drum 38, the said cam groove having a dwell portion 37a at one end thereof. The drum 38 is fixedly mounted upon a shaft 39 which is rotatably mounted in suitable bosses provided in the frame 33 of the headstock H.

Figure 3:
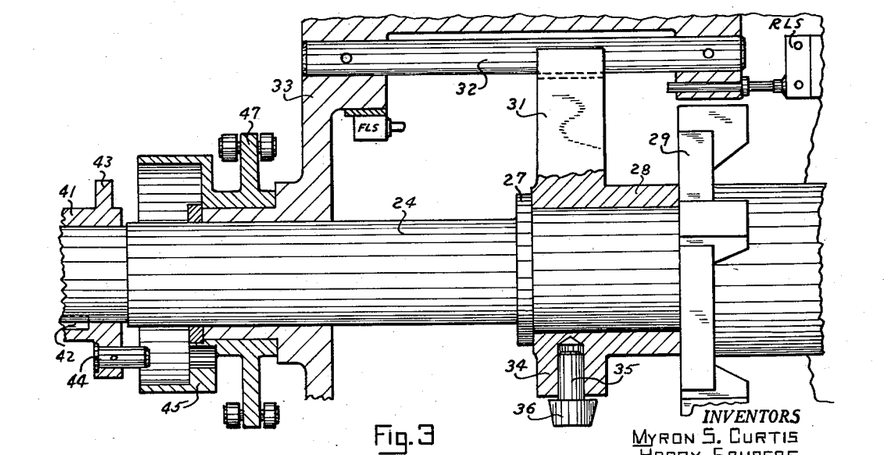
Fig. 3 is a fragmentary view of the top portion of the apparatus shown in Fig. 2 and showing the parts in a different position.
Figure 4:
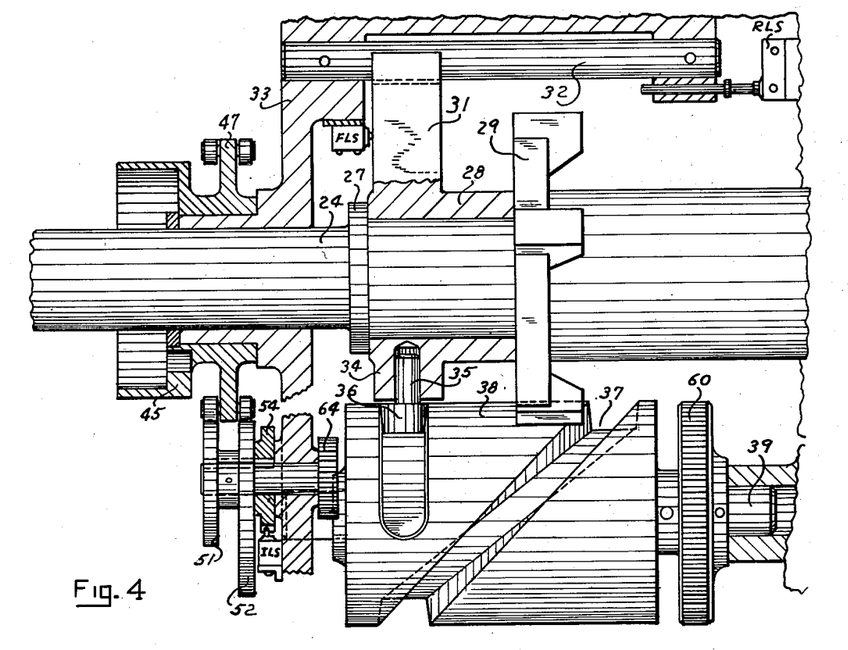
Fig. 4 is a fragmentary view of the upper portion of the structure shown in Fig. 2 and illustrating the parts at the other extreme of their movement.
Figures 5, 6:
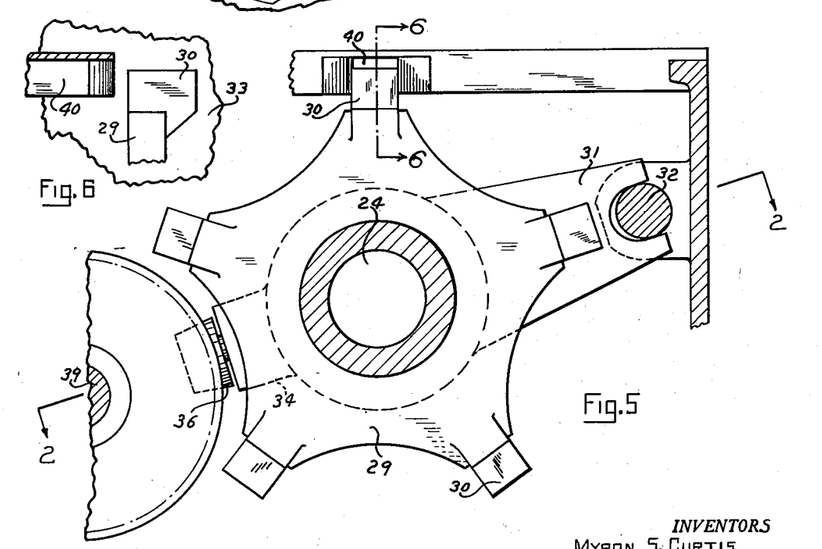
Fig. 5 is a sectional view looking from the right of the upper portion of Fig. 2.
Fig. 6 is a fragmentary, sectional view substantially on the line 6—6 of Fig. 5 and showing one of the guiding lugs in elevation.

The cam drum 38 is rotatable in either direction for reciprocation of the member 28; clockwise rotation of the drum 38 moving the member 28 from the position shown in Fig. 2 to that shown in Fig. 4, and counter-clockwise rotation of the said drum returning the member 28 to the position shown in Fig. 2, the forked portion 31 and the bar 32 preventing rotation of the member 28 when so actuated. When the said cam 38 reciprocates the member 28, the shaft 24 of the tool support, of course, moves therewith and carries the spider 29 and the tool supporting head 22 as a unit. As the said spider 29 moves to the left (as seen in Figs. 2, 3 and 4), one of the lugs 30 on the said spider will be positioned, in a manner subsequently to be described, to enter a longitudinally extending guideway 40 provided in the frame 33 (see Figs. 5 and 6), the outer end of this guideway 40 having its edges beveled or otherwise flared slightly to assist in guiding the lug 30 therein. This guideway 40 is provided for the purpose of preventing rocking motion of the shaft 24, and consequently of the tools (or workpieces) carried thereby, during reciprocation in a machining operation.

The shaft 24 extends beyond the boss 26 and is provided on the extending portion with a sleeve 41, which is connected with the said shaft 24 by means of a key 42. The sleeve 41 has a flange 43 in which is mounted a pin or stud 44 having a projecting portion adapted to be received within an opening provided in an indexing member 45. The indexing member 45 is rotatably journalled upon a reduced portion of the boss 26 and is retained against longitudinal movement thereon by a collar 46. The indexing member 45 is also provided with an integral indexing disk 47, on one face of which are mounted a plurality of equally spaced studs and rollers 48 (see also Fig. 7) corresponding in number to the number of tool (or workpiece) supporting faces 23 of the tool supporting head 22. On the opposite face of the said disk 47 are provided a plurality of studs and rollers 49 equally spaced about the periphery of the disk, the rollers 49 being equal in number to the number of rollers 48 and circumferentially spaced with respect thereto.

A shaft 50 is journalled in the frame 33 below the indexing disk 47, the outer end of the shaft being provided with a pair of cam members 51 and 52, which are identical in shape but angularly spaced and oppositely disposed. These cams are keyed for rotation with the shaft 50 by means of a key or keys 53, the periphery of the cam 51 cooperating with the aforementioned rollers 48 and the cam 52 cooperating with the rollers 49, whereby rotation of the shaft 50 will cause the disk 47 (and hence the tool supporting head 22) to be indexed and locked in an indexed position. For this purpose, the peripheries of the cams 51 and 52 are so shaped as to constitute a plurality of roller-driving, roller retarding, and arcuate portions or surfaces. These surfaces are so arranged that when a roller-driving surface of one cam is in engagement with one of the rollers on disk 47, the next succeeding roller on the opposite side of the disk will be riding upon a roller-retarding surface of the other cam. As the cams rotate they alternate in their roller-driving and roller-retarding functions so that the disk 47 (and tool supporting head 22) are indexed under positive control at all times, the roller-retarding function of the cams being provided to positively regulate the rate of indexing in order that unbalanced distribution of weight on the tool head will not interfere with accurate indexing thereof. The surfaces of the cams 51 and 52 are each further provided with a notch portion for receiving a roller on one face of disk 47 during the short interval of transition from roller-driving to roller-retarding function of the other cam. These notch portions, therefore, enable either cam to provide both roller-driving and roller-retarding functions during this brief transition period so that positive control of the indexing is not interrupted.

Figure 7:
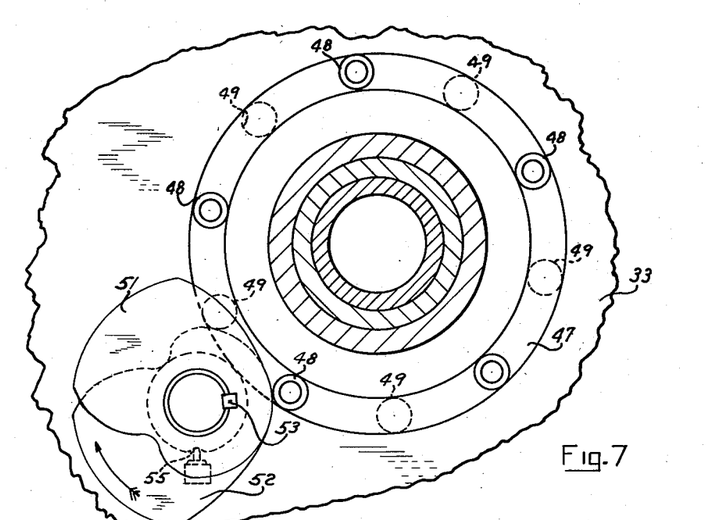
Fig. 7 is a sectional view taken substantially on the line 7—7 of Fig. 2 and showing the indexing cams in one position.
Figure 8:
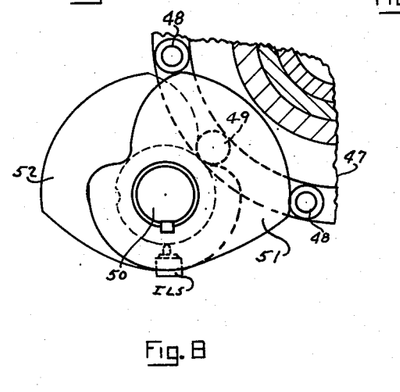
Fig. 8 is a fragmentary view of the parts illustrated in Fig. 7 and showing the indexing cams in a different position.
Figure 9:
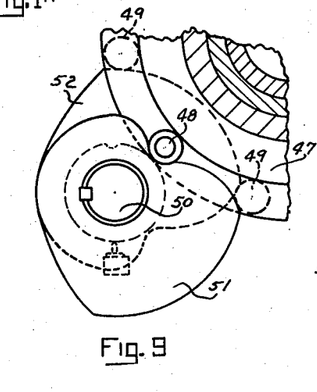
Fig. 9 is a fragmentary view similar to Fig. 8, but showing the indexing cams in yet another position.
Figure 10:
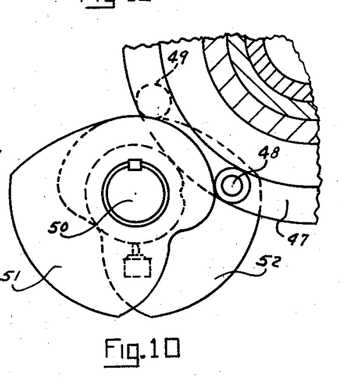
Fig. 10 is a fragmentary view similar to Figs. 8 and 9 but showing the indexing cams in a still different position.

The operation of the cams 51 and 52 during one complete cycle of indexing is illustrated in Figs. 7, 8, 9 and 10. As shown in Fig. 7, the cams are so disposed that they engage adjacent rollers 48 and 49, respectively, to hold the disk 47 (and hence the tool supporting head 22) locked in an indexed position since corresponding arcuate portions of the two cams are in engagement with their cooperating rollers. As shaft 50 begins to rotate from the position shown in Fig. 7, the cam 51 will drive the roller 48 in a clockwise direction, the roller 49 then riding upon cam 52 to regulate the rate of advance of the disk 47 and tool supporting head 22. When shaft 50 has made a quarter of a revolution, the indexing cycle is one-fourth completed and the parts occupy the positions shown in Fig. 8. At this time the cam 51 has ceased to drive and is about to cooperate with the next succeeding roller 48 in a roller-retarding capacity. Therefore, a roller 49 has moved into the notch in cam 52 so that the latter momentarily takes over sole control of the indexing operation during the transition of cam 51 from its driving to its retarding function. Continued rotation of shaft 50 now causes cam 52 to drive and cam 51 to regulate the driving of disk 47 until the parts occupy the positions shown in Fig. 9 which represents the indexing cycle one-half completed.

It will be seen that a roller 48 is now positioned in the notch of cam 51 which therefore momentarily takes over sole control of the indexing during the transition of cam 52 from its driving to its retarding function. Cam 51 now drives and cam 52 regulates the indexing until the parts reach the positions shown in Fig. 10, at which time arcuate portions of the same radius on both cams are beginning to engage the rollers 48 and 49. At this time the shaft 50 has completed three-fourths of one complete revolution and the disk 47, and tool head 22, have been accurately indexed one step. The shaft 50 and cams 51 and 52, however, continue to turn an additional quarter revolution thus returning these parts to the positions shown in Fig. 7. Since the arcuate portions of the cams are in engagement with the rollers 48 and 49 during this portion of the cycle, the disk and tool head will not be moved. Hence, when the shaft 50 is stopped at the end of one complete revolution, the tool head 22 is accurately indexed and is locked in that position by the engagement of cams 51 and 52 with the rollers 48 and 49, respectively, the mechanism being conditioned to further index the disk and tool head when shaft 50 is again rotated.

The indexing mechanism is further described and claimed in U. S. Patent 2,560,686, entitled "Machine Tool," granted July 17, 1951 to Myron S. Curtis, on an application Serial No. 684,594, filed July 18, 1946, to which reference is had for further detail of this mechanism. It is sufficient for the present disclosure to note that the shaft 50 makes a single complete revolution for each step of the indexing cycle and then remains at rest until indexing is to again be effected. This control is accomplished by electrical means actuated by a switch operating disk 54, which is connected for rotation with the shaft 50 and is provided with a notch 55 corresponding to the locked position of the indexing mechanism. Adjacent to the periphery of the disk 54 is an electrical switch ILS, which may be mounted by means of a bracket 57, or other suitable support, upon the framework 33. This switch ILS has an operating button 56 projecting therefrom and riding upon the periphery of the disk 54, the switch being provided with two sets of contacts operated by button 56 for controlling the operation in a manner hereinafter described.

The power for operating the reciprocating and indexing mechanism for the tool support 21 is provided by a single, reversible, electrical motor 58 which has its armature shaft connected with a power transmission unit generally designated 59. This power transmission unit may take a variety of forms, but in its essential characteristics comprises: a driving member, two driven members and means for selectively connecting one of said driven members for rotation by said driving member, one of the driven members being connected for rotating the drum 38 and the other of said members being connected to rotate the shaft 50. Rotation of drum 38 is effected by providing its shaft 39 with a gear 60 connected therewith and meshing with a gear 61 journalled upon a cross shaft 62, which is rotatably supported in the framework 33 of the headstock H. The gear 61 meshes with a gear 63, which is rotatably connected with one of the said driven means in the power transmission unit 59. The shaft 50 is provided with a gear 64 which is driven either by means of gearing, or by a chain, 65 cooperating with a gear 66 mounted upon the shaft 62 to turn therewith. The shaft 62 is further provided with a gear 67 connected to the shaft for rotation therewith, this gear 67 being driven by the other of said driven means.

Figure 11:
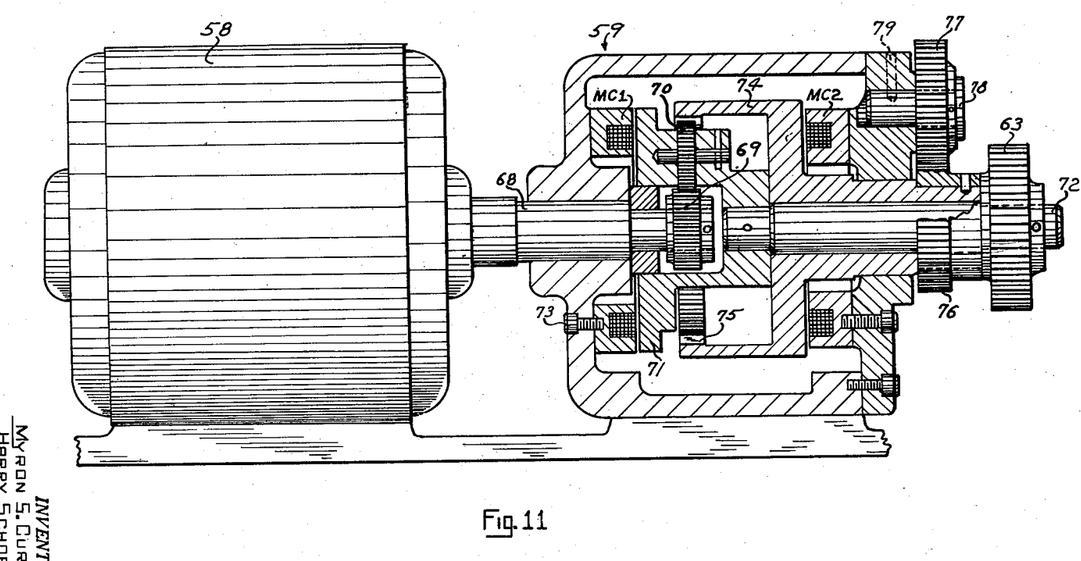
Fig. 11 is a side elevational view, partly in section, illustrating the motor and power transmission unit on an enlarged scale.

In the embodiment illustrated in Figs. 2 and 11 the driving member for the power transmission unit 59 is a shaft 68 which is connected with the armature of the reversible motor 58. This shaft 68 is journalled within the casing of the power transmission unit 59 and provided on its inner end with a gear 69 rotatable therewith. The gear 69 constitutes a sun gear of an epicyclic gearing train and is in mesh with one or more planetary gears 70 rotatably journalled in a gear carrier 71. The gear carrier is connected with a shaft 72 for rotation therewith, and the outer end of the shaft 72 is connected to the previously mentioned gear 63. Gear carrier 71 is constructed of magnetically permeable material and rotates closely adjacent an electromagnet MC1, which is connected to the casing of the power transmission unit by means of screws 73 or other fastening means. Rotatable upon the shaft 72, and journalled within an opening of the housing for the unit 59, is a member 74, having a forwardly projecting cup-shaped portion provided with an internal ring gear 75 adapted to run in mesh with the planetary gears 70. A portion of the member 74 has a planar face which rotates closely adjacent a stationary electromagnet MC2, the said member 74 being formed of magnetically permeable material for cooperation with the electromagnet MC2 as an armature thereof. The outer end of member 74 is provided with a reduced portion, to which is secured a gear 76. This gear 76 runs in mesh with a pinion 77, rotatable upon a stub shaft 78, the shaft 78 being fixed in the wall of the power transmission unit 59 by means of a pin or screw 79. The pinion 77 also runs in mesh with the previously mentioned gear 67 upon the shaft 62.

The construction is such that, when the electromagnet MC1 is energized, the gear carrier 71 will be magnetically attracted into frictional engagement with electromagnet MC1 and thus held stationary. Hence, rotation of the gear 69 by the motor 58 will cause gears 70 to drive the ring gear 75, member 74, and gear 76 connected therewith. This rotates the pinion 77, gear 67, shaft 62 and gear 66 connected therewith. The rotation of gear 66 causes the gearing, or chain, connection 65 to drive the gear 64, thus rotating shaft 50 and the cams 51, 52 connected therewith. Rotation of the cams 51 and 52 indexes the disk 47, and consequently the tool (or work support) 21, one step until the contact disk 54 has operated the switch ILS to interrupt the circuit for the electric motor 58 and deenergize electromagnet MC1, as will be hereinafter described. The gear ratios employed in this drive are such that the indexing movement is relatively slow.

When MC2 is energized, the member 74 will be magnetically attracted into frictional engagement therewith, thus holding the said member 74 and gear 75 stationary. The electromagnet MC1 is deenergized at this time allowing free rotation of the gear carrier 71. Hence, the gear 69 (which is driven by the motor 58) now drives the planetary gears 70 around the periphery of the gear 75, thus causing the gear carrier 71 to rotate carrying with it the shaft 72 and the gear 63. Rotation of the gear 63 causes gears 61 and 60 to rotate, thus turning the cam drum 38 and causing the tool support 21 to be moved in a longitudinal direction by the action of the cam groove 37 and the cooperating roller 36 carried by the member 28 upon the shaft 24 of the tool support. The direction of motion of the said tool support may be controlled by reversal of the direction of rotation of the motor 58.

Figure 12:
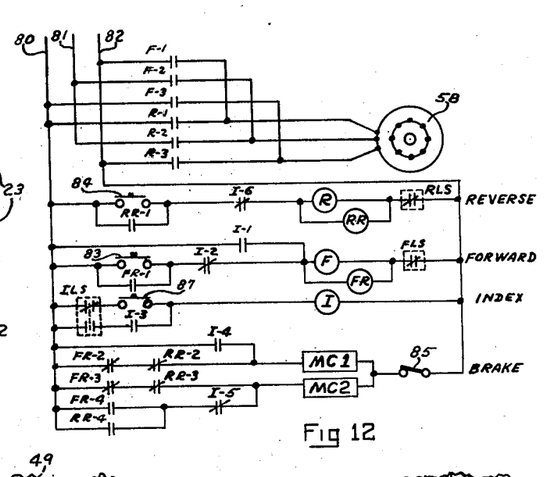
Figure 12A:
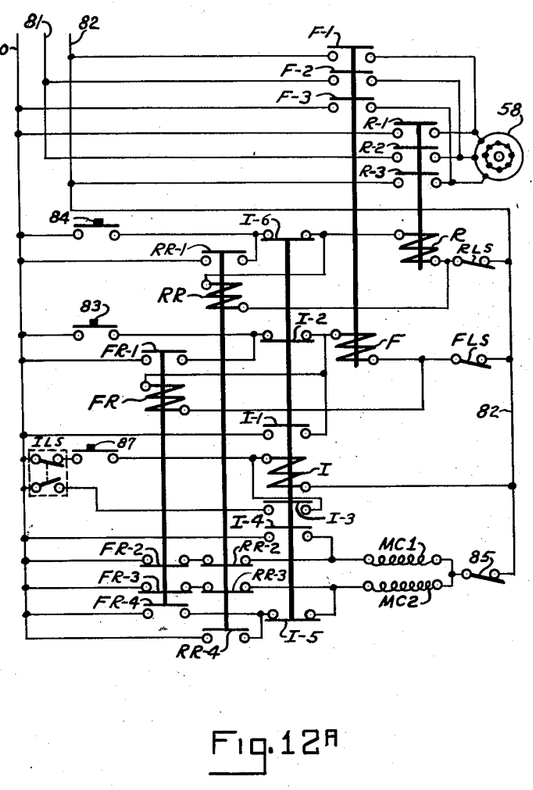

Figs. 12 and 12A illustrate an electrical circuit which may be employed for operation of the electrical motor and power transmission unit disclosed in Figs. 2 and 11, the two figures both representing the same circuit with Fig. 12 being drawn in accordance with the practices of the machine tool industry while Fig. 12A is drawn in accordance with the requirements of the Patent Office. In both representations, the reference numerals 80, 81 and 82 designate, respectively, the three wires of a three phase source of electrical power, leads being provided therefrom to the reversible motor 58 through the contacts F-1, F-2, and F-3, and contacts R-1, R-2, and R-3. These leads and contacts provide for selective energization of the motor for either forward or reverse rotation thereof; the contacts F-1, F-2, and F-3 controlling the circuit for energizing the motor for forward rotation, and the contacts R-1, R-2, and R-3 controlling the energization for reverse rotation. In order to operate these contacts and the associated contacts and relays of the circuit, push buttons 83 and 84 are provided upon the headstock of the machine tool at a convenient point, as shown in Fig. 1. The push button 83, as shown in Fig. 12 or Fig. 12A, is adapted to close a circuit from the line 80 through normally closed contacts I-2, a relay F, and the normally closed contacts of switch FLS, to the power lead 82. This energizes the relays F and FR controlling the contacts F-1, F-2, F-3, and FR-1, FR-2, FR-3, and FR-4, respectively. Closing of contacts F-1, F-2 and F-3 energizes motor 58 for rotation in a forward direction. Closing of the contacts FR-1 provides a holding circuit around the switch 83, thus holding the relays F and FR energized until the switch FLS is operated to open its contacts. This switch FLS is a delayed action limit switch which, as shown in Figs. 2, 3 and 4, is mounted upon the framework 33 of the headstock H in a position to be operated by the member 31 (carried by the shaft 24 of the tool or work support) when the said tool or work support has been advanced to its extreme position.

The contacts FR-4, closed by the aforementioned operation of relay FR, complete a circuit from the power line 80 through the normally closed contacts I-5, the electromagnet MC2, and a brake switch 85 (which may have its actuating member conveniently located upon the headstock H, see Fig. 1) to the power line 82. Energization of the electromagnet MC2 retains the member 74 stationary, as previously described, thus establishing driving connections from the motor shaft 68 to the gear 63, which as previously mentioned, will rotate the cam drum 38 in a direction to advance the tool support 21 (i. e. to the left as seen in Figs. 2, 3 and 4). Energization of relay FR also opens the contacts FR-2 and FR-3. Opening of the former breaks the circuit to the electromagnet MC1, thus preventing its energization at the time when MC2 is energized. As the tool or work support begins its advance, one of the lugs 30, carried by the spider 29, will enter the guideway 40 and move longitudinally therein throughout the advance of the tool support, thus preventing rocking of the support and the tools carried thereby during the machining operation. The advancing of the tool support also disengages pin 44 from the member 45 so that the indexing mechanism is disconnected from the tool support when the latter is reciprocated. The parts are so proportioned that a lug 30 begins to enter the guideway 40 just before the pin 44 is disengaged from the indexing member 45, and conversely. Hence, the tool support is never free to turn of itself under the influence of unbalanced distribution of the weight of tools mounted upon the tool supporting head 22. Thus: during reciprocation, the lug 30 and guideway 40 prevents rotation; during indexing, the cams 51 and 52 continuously control the movement of the tool support; after indexing, the cams hold the tool support locked in its final indexed position; and (as mentioned above) the lug 30 is not disengaged from the guideway until the pin 44 is connected to the indexing mechanism, or conversely, so that one or the other of these means is at all times effective to prevent improper rocking or rotation of the tool support.

When the tool support has advanced to its extreme position, the member 31 will contact the operating button of the limit switch FLS (see Fig. 4). Since the switch FLS is of the delayed action type, its contacts will remain closed for a predetermined interval after the operating button therefor has been engaged by the member 31 thus allowing the roller 36 to enter the dwell portion 37a of the cam groove in the drum 38. This permits the "set," acquired by the tool support (and the tools carried thereby) during the machining operation, to be relieved in the well-known manner. The delayed action switch FLS is, of course, so regulated that its contacts will close before the roller 36 has reached the end of the dwell portion 37a of the cam groove, thus opening the aforementioned holding circuit, for the relays F and FR. Deenergization of relay F causes contacts F-1, F-2, and F-3 to open, thus deenergizing the motor 58. Deenergization of relay FR opens contacts FR-4 and closes contacts FR-2, FR-3. Closing of the latter contacts completes a circuit from the line 80 through the normally closed contacts RR-3, electromagnet MC2, and brake switch 85, to the power line 82. Likewise, closing of the contacts FR-2 completes a circuit from line 80 through the normally closed contacts RR-2, electromagnet MC1, and brake switch 85, to the power line 82. Hence, both the electromagnets MC1 and MC2 are energized simultaneously for effecting a braking and holding action upon both of the driven members, 63 and 77, thus preventing rotation thereof.

The tool support 21 may now be returned to its initial position by manually closing switch 84, which completes a circuit from power line 80 through the normally closed contact I-6, relays R and RR (which are connected in parallel), and the normally closed limit switch RLS, to the power line 82. Energization of relay R closes the contacts R-1, R-2 and R-3, thus energizing the motor 58 for rotation in a reverse direction to that of its previous motion. The energization of the relay RR closes the contacts RR-1 to provide a holding circuit for the relays R and RR under control of the limit switch RLS. Energization of the relay RR also opens the normally closed contacts RR-2 in the circuit of electromagnet MC1, thus preventing its energization. Simultaneously, contacts RR-3 in the circuit of electromagnet MC2 are likewise opening. The relay RR, however, also closes contacts RR-4, which completes a circuit from power line 80 through the said contacts RR-4, normally closed contacts I-5, electromagnet MC2, and brake switch 85, to power line 82.

The energization of the electromagnet MC2 holds the member 74 stationary so that the motor 58 now rotates the driven member 63 in a reverse direction (due to the reverse rotation of the motor armature), which in turn drives the drum 38 through the gears 61 and 60 to reciprocate the support 21 to its starting position (i. e., towards the right, as shown in Fig. 2). When the said tool support has returned to its starting position, the member 31 contacts a pin 86, slidably mounted in a boss of the housing 33, thus opening the contacts of the normally closed limit switch RLS. Opening of these contacts opens the holding circuit for the relays R and RR and hence the circuit is restored to the condition indicated in Figs. 12 and 12A wherein the motor 58 is deenergized and the electromagnets MC1 and MC2 are simultaneously energized to prevent rotation of either of the driven members 63 and 77.

It will be recalled that one of the lugs 30 on the spider 29 is sliding within the guideway 40 as the tool support is reciprocated. Hence, the pin 44 (see Figs. 2 and 3) is at all times maintained in exact alignment with the cooperating opening in the indexing member 45. Therefore, when the tool support reaches its initial position (Fig. 2) the pin 44 will have reentered the said opening in the indexing member 45, and reconnected the indexing mechanism with the tool support. At this time the lug 30 will have been completely removed from the guideway 40 and the tools carried by the tool supporting head 22 will be removed from engagement with the work (supported in the spindle 20) so that the tool support may now be indexed to bring a different tool into operating position.

The indexing is effected by momentarily operating a switch 87, the actuating member of which may be conveniently located adjacent the aforementioned switches 83, 84 and 85 upon the headstock of the machine. Closing the contacts of switch 87 completes a circuit from power line 80 through the normally closed contacts of a limit switch ILS, and through relay I, to the power line 82. Energization of relay I closes the normally open contacts I-1 completing a circuit from power line 80 through relays F and FR, and the normally closed limit switch FLS, to the power line 82. This energizes relay F closing the normally open contacts F-1, F-2 and F-3 to energize motor 58 for rotation in a forward direction. Energization of relay I will also close contacts I-4, thus completing a circuit from power line 80 through the said contacts I-4, electromagnet MC1, and brake switch 85, to the power line 82. Simultaneously, contacts I-5 are opened, thus preventing energization of the electromagnet MC2 by the closing of the contacts FR-4.

The energization of electromagnet MC1 holds the gear carrier 71 stationary so that the rotation of gear 69, by the motor 58, now drives through the planetary gears 70 to rotate the gear 75, members 74, and gear 76 affixed thereto. This rotation of gear 76 rotates gear 67, through pinion 77, thus driving shaft 62, gear 66, the gearing or chain 65 and gear 64 to drive shaft 50, which carries the switch operating disk 54 and the cams 51 and 52. As the disk 54 begins to rotate, the notch 55 therein passes from contact with the operating button 56 of switch ILS so that the button 56 is depressed thus opening the normally closed upper contacts (see Fig. 12 or Fig. 12A), and simultaneously closing the lower contacts, of the switch ILS. This completes a holding circuit for the relay I from power line 80 through the said lower contacts of switch ILS, contacts I-3, which are now closed, and through the relay I, to the power line 82 so that the relay I is now maintained in its energized position under the control of switch ILS, the button 56 of which is maintained in depressed position, since it rides upon the circumference of the disk 54.

The energization of relay I has also opened the contacts I-2 so that the energization of the relays F and FR (which control the motor and electromagnet MC2) are now controlled only through previously mentioned contacts I-1, it being remembered that the tool support does not reciprocate during its indexing motion and, therefore, the switch FLS will remain closed. The energization of relay I will also have opened the contacts I-6 so that inadvertent operation of the reverse switch 84 will not energize relay R with consequent short circuiting of the power leads through the contacts R-1, R-2, and R-3.

The establishment of the above conditions causes the shaft 50, and hence the cams 51 and 52, to rotate through one complete revolution, thus moving the indexing disk 47 one step by the cooperation of the cams 51 and 52 with the rollers 48 and 49. It will be remembered that the disk 47 is now connected to the tool support by means of the engagement of the pin 44 in the opening of the index member 45. Hence, rotation of disk 47 produces rotation of the sleeve 41 and consequently of the shaft 24 of the tool support to index the latter one step. As this indexing operation is completed, the switch operating disk 54 will have returned to the position indicated in Fig. 7, thus allowing the button 56 of switch ILS to reenter the notch 55. This opens the lower contacts of switch ILS, opening the aforementioned holding circuit for relay I and deenergizing the latter.

Deenergization of relay I opens contacts I-1, thus deenergizing relays F and FR and returning the circuit to its initial condition shown in Fig. 12 or Fig. 12A. It will be noted that the contacts I-4 will then be open, but the contacts FR-2 will be closed so that electromagnet MC1 will be energized by a circuit extending from the power line 80 through the contacts FR-2, RR-2, the said electromagnet MC1, and brake switch 85, to the power line 82. Likewise, electromagnet MC2 will be energized by a closed circuit extending from the power line 80 through contacts FR-3, RR-3, the said electromagnet MC2, and brake switch 85, to power line 82. The joint energization of electromagnets MC1 and MC2 in this manner is substantially instantaneous with the return of the switch actuating disk 54 to the position shown in Figs. 2 and 7 so that a positive brake is applied upon the elements of the power transmitting unit, thus preventing further rotation of the driven members thereof and instantly stopping rotation of the tool support at the desired position. It should also be noted that when indexing is effected, the motor 58 can be energized for rotation in a forward direction only and then only under the control of the relay I so that inadvertent operation of switches 83 and 84 will have no effect, the contacts I-2 and I-6 in the circuits of these switches being held open. The brake switch 85 may be thrown to its off position when the machine is not in operation or for purposes of setup, thus preventing overheating of the electromagnets MC1 and MC2 by continuous energization thereof over long periods of time.

Figure 13:
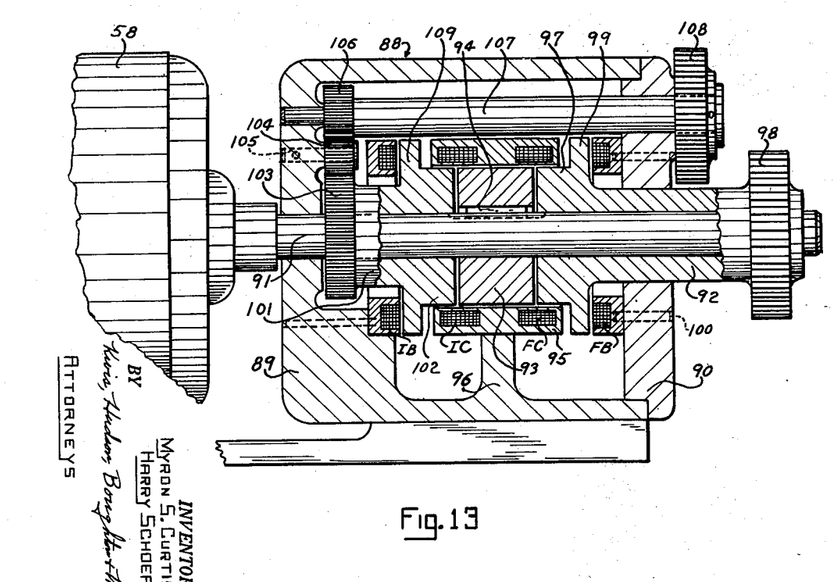
Fig. 13 is a sectional view through a modified form of a power transmission unit and showing a motor (in partial side elevation) connected thereto.

In Fig. 13 there is illustrated a modified form of a power transmission unit, which may be employed in the apparatus previously described in place of the power transmission unit 59. This modified unit, designated generally 88, comprises a housing having end walls 89 and 90, at least one of which is removable. A shaft 91, constituting the driving member of the unit, has one end journalled in the end wall 89 and extends therethrough for connection with the reversible motor 58. The other end of the shaft 91 is journalled in a sleeve member 92, which is in turn journalled in the end wall 90 of the housing. Intermediate its ends, the shaft 91 is provided with a collar 93 of magnetically permeable material and is connected for rotation with shaft 91 by means of a key and keyway 94.

Surrounding the collar 93, and having a longitudinal length greater than that of the said collar so as to extend beyond the side faces of the latter, is a housing member 95 for a pair of electromagnets IC and FC. This housing member 95 is stationarily supported within the power transmission unit 88 by an internal web or flange portion 96.

The sleeve member 92 is provided with an enlarged cylindrical portion 97 extending within one end of the magnetic housing 95 and closely adjacent a side face of the collar 93, the electromagnet FC being so disposed as to be in straddling relationship with respect to this cylindrical portion 97 and the corresponding portion of the collar 93. The collar 93 and the sleeve 92 are constructed of permeable material so that when the electromagnet FC is energized the magnetic lines of force will cause the said sleeve and collar to shift into engagement and thereby form a driving connection between the driving member 91 and the sleeve 92. The outer end of this sleeve has a gear 98 attached thereto, or integrally formed thereon, and this gear constitutes one of the driven members of the power transmission unit 88. This gear 98 is adapted to mesh with the gear 61 in the previously described apparatus (see Fig. 2) to effect reciprocation of the tool support 21.

The sleeve 92 is also provided with a flange, or disk-shaped, portion 99 adjacent an electromagnet FB, which is mounted upon the inner surface of the end wall 90 and is held stationary thereon by suitable means, such as pins 100. The flange 99 is adapted to act as an armature for the electromagnet FB. Hence, when the latter is energized, the sleeve 92 will shift slightly in a longitudinal direction for engagement of the flange 99 with the electromagnet FB, thus providing an electromagnetically operated friction brake for the member 92, and hence for the reciprocating mechanism of the tool support.

Journalled upon that portion of shaft 91 extending between the end wall 89 and the collar 93 is a rotatable member 101 of magnetically permeable material. This member 101 has a reduced cylindrical portion 102 adapted to extend into the adjacent end of the magnetic housing 95 closely adjacent the corresponding end face of collar 93, with the electromagnet IC extending in straddling relationship about the ends of this portion 102 and the corresponding portion of the collar 93. Hence, when the electromagnet IC is energized, the magnetic lines of force will cause the member 101 and the collar 93 to shift into engagement, thus providing a friction drive between these members.

The outer end of member 101 is provided with a gear 103, which may be integral with the member 101 or connected thereto, and this gear runs in mesh with a pinion 104, which is journalled upon a stub shaft 105 extending through the end wall 89. Pinion 104 is in mesh with a gear 106 which is connected with a shaft 107, journalled in the end walls 89 and 90 and extending through the latter. The outer end of the shaft 107 is provided, exteriorly of the transmission unit 88, with a gear 108 connected for rotation with the said shaft. This gear 108 may then be employed to drive the gear 67 and the associated mechanism for indexing the tool support (see Fig. 2).

The member 101 is also provided with a flange or disk portion 109 intermediate of the cylindrical portion 102 and the gear 103. The flange 109 rotates closely adjacent an electromagnet IB, which is stationarily mounted in the end wall 89. The electromagnet IB operates as a brake for the indexing mechanism by virtue of the fact that, when it is energized, the member 101 will shift into engagement therewith under magnetic influence, thus preventing further rotation of the member 101 and the driving mechanism for indexing the tool support.

The mechanism just described is provided with an electrical circuit of such a nature that when the tool support is to be reciprocated, the electromagnet FC will be energized, thus clutching driving member 91 to the gear 98. At the same time the electromagnet IB will be energized to effect braking and holding of the member 101 thus preventing operation of the indexing mechanism. Conversely, when the electromagnet IC is energized, it will effect clutching of the driving member 91 to the member 101 to thereby drive the gear 108 and the indexing mechanism. Simultaneously, the electromagnet FB wil be energized to effect braking and holding of the sleeve 92, and consequently prevent reciprocation of the tool support.

Figure 14:
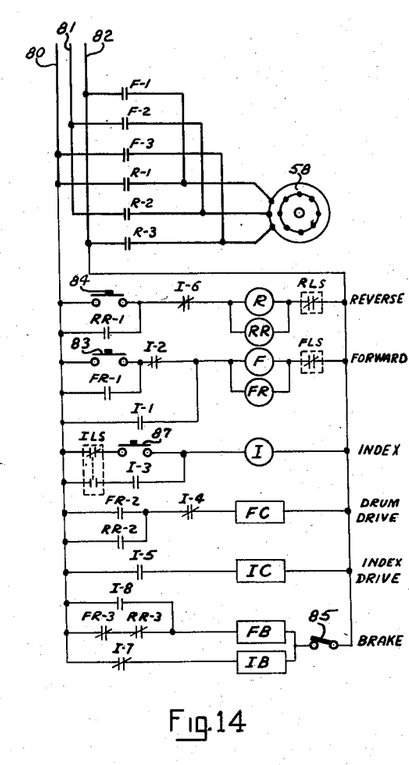
Figure 14A:
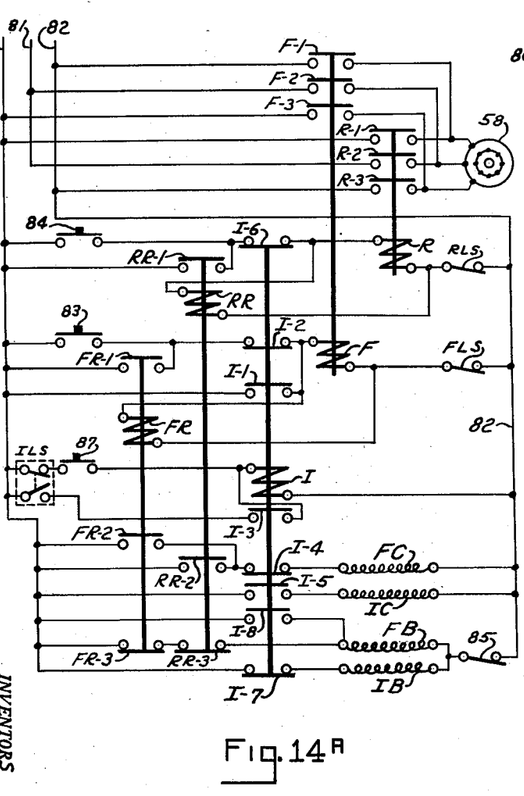

In Figs. 14 and 14A there is illustrated a circuit for use with the modified form of the transmission unit illustrated in Fig. 13, both Figs. 14 and 14A representing the same circuit with Fig. 14 being drawn in accordance with standard practices of the machine tool industry while Fig. 14A is drawn in accordance with the requirements of the Patent Office. This circuit employs the same relays and switches as those in the circuit shown in Figs. 12 and 12A and consequently bear the same reference numerals. As before, power is supplied from a three-phase source of alternating current by the power lines 80, 81 and 82, which are selectively connected through the contacts F-1, F-2, and F-3, or R-1, R-2 and R3, to energize the motor 58 for rotation in forward or reverse directions, respectively. Likewise, the circuit is controlled by the same push buttons located upon the headstock of the machine.

With the apparatus in its starting position; that is, with the tool support in a position corresponding to that shown in Fig. 2, operation of the push button 83 will close a circuit from power line 80 through the contacts of switch 83, normally closed contacts I-2, relays F and FR, and the normally closed contacts of switch FLS, to the power line 82. Energization of the relay F closes the contacts F-1, F-2, and F-3 to energize the motor 58 for rotation in a forward direction. Operation of the relay FR closes the normally open contacts FR-1 providing a holding circuit around the switch 83, thus maintaining the relays F and FR energized until switch FLS is operated to open its contacts. It will be noted that, in this initial position of the tool support, the member 31 is in engagement with pin 86 (see Fig. 2), thus holding the contacts of switch RLS open and preventing energization of the relays R and RR.

Energization of the relay FR also closes the contacts FR-2, thereby closing a circuit from power line 80 through the normally closed contacts I-4, and the electromagnet FC, to the line 82. Electromagnet FC then clutches the collar 93 to the cylindrical portion 97 of the sleeve 92, thereby forming a driving connection from the shaft 91 through the sleeve 92, and gear 98, to gears 61 and 60 for reciprocating the tool support 21. Simultaneously, a circuit will be closed from power line 80 through the normally closed contacts I-7, electromagnet IB, and the closed brake switch 85, to the power line 82, thus energizing the electromagnet IB and thereby holding the flange 109 of the member 101 from rotation. This prevents operation of the indexing mechanism. In addition, the energization of relay FR opens the normally closed contacts FR-3, thus opening the circuit of the electromagnet FB and preventing the energization thereof so that the sleeve 92 is free to rotate when clutched with the collar 93, as previously mentioned.

As the tool support is advanced, one of the lugs 30 will enter the guideway 40 to prevent any lost-motion rocking of the shaft 24 and the other parts of the tool support 21 as the tools are advanced into engagement with the workpiece supported in the spindle 20 (see Fig. 1). Also during the advance of the tool support, the pin 44 will be removed from the opening in the index member 45, thus disconnecting the indexing drive from the tool support. The relative positions of the tool support, the pin 44, and index 45 during an intermediate portion of the forward motion are illustrated in Fig. 3, while Fig. 4 illustrates the extreme forward position of the said tool support.

When the tool support has reached the position indicated in Fig. 4, the member 31 thereon will contact the actuating member of the switch FLS, thus opening the normally closed contacts thereof and consequently opening the circuit through the relays F and FR. Deenergization of these relays opens the circuit to the motor 58, by opening the contacts F-1, F-2 and F-3, and also deenergizes the electromagnet FC by opening the contacts FR-2. This latter operation declutches the driven member 98 from the driving member 91. Simultaneously, the contacts FR-3 will be closed, thus closing a circuit from line 80, through the electromagnet FB, and brake switch 85, to the power line 82. This energizes the electromagnet FB, providing braking action upon disk or flange 99 so as to stop and positively hold the gear 98 from further rotation, and hence discontinue the advancing movement of the tool slide. The switch FLS, being preferably of the time delay type, does not, however, instantly open its contacts. This enables the provision of a dwell period for the total support. The additional rotation of the gears 98, 61, 60 and cam drum 38, which occurs during the interval between actuation of the button of switch FLS and the latter opening of its contacts simply cause the roller 36 to ride into the dwell portion 37a of the cam groove 37 so that there is no further advancing of the tool support. This permits the "set," acquired by the tool support (and the tools carried thereby) during the machining operation, to be relieved in the well-known manner. The delayed action switch is, of course, so regulated that its contacts will close before the roller 36 has reached the end of the dwell portion 37a of the cam groove.

The tool support may now be returned to its starting position by momentarily depressing push button 84. This closes a circuit from power line 80 through the normally closed contacts I-6, relays R and RR and the normally closed contacts RLS, to power line 82. The resulting energization of relay R closes the contacts R-1, R-2, and R-3, thus connecting the motor 58 to the power leads 80, 81 and 82 for rotation of the motor in a reverse direction. Energization of relay RR closes the normally open contacts RR-1, thus providing a holding circuit for the relays R and RR. The energization of relay RR also closes the normally open contacts RR-2, thus energizing electromagnet FC (contacts I-4 being normally closed) which clutches collar 93 and shaft 91 to the cylindrical portion 97 of the sleeve 92 with consequent rotation of the gears 98, 61, 60 and drum 38 in a reverse direction to that previously described. In addition, the energization of relay RR opens the circuit through electromagnet FB by opening the contacts RR-3, so that the parts previously mentioned are free to rotate. Simultaneously, the circuit through the normally closed contacts I-7 energizes the electromagnet IB to hold the indexing mechanism from rotation. As the tool support is thus returned to starting position, the pin 44 will reenter the opening in the indexing mechanism 45 to again couple the indexing mechanism to the shaft 24 of the tool support. This is made possible by the fact that the lug 30, being guided in the ways 40, has maintained the pin 44 in alignment with the opening in member 45 throughout the reciprocation.

When the tool support reaches its starting position, the lug 30 will leave the guideways 40 and the member 31 will engage the pin 86 to operate switch RLS, thus opening the contacts of the latter and deenergizing the relays R and RR. This deenergizes the motor 58 by opening the contacts R–1, R–2 and R–3. Also, contacts RR–2 are now opened, deenergizing electromagnet FC with consequent declutching of the collar 93 from the sleeve 92. Furthermore, contacts RR–3 reclose, closing the circuit through the electromagnet FB, energizing the latter, and thus braking the rotation of sleeve 92 and stopping the reciprocation.

With the mechanism at its starting position, as illustrated in Fig. 2, the tool support may now be indexed to bring a new tool into operative position by manually depressing the push button 87. This closes a circuit from the power line 80 through the normally closed contacts of switch ILS, and relay I, to the power line 82. The resulting energization of relay I then closes the normally open contacts I–1 energizing relays F and FR under control of relay I. Energization of relay F closes the contacts F–1, F–2, and F–3 to energize the motor 58 for rotation in a forward direction. The energization of relay I also closes the normally open contacts I–5, energizing electromagnet IC, which by its magnetic attraction, will clutch collar 93 to member 101. This provides a driving relationship from the shaft 91 through the gears 103, 104, 106, shaft 107 and gear 108 to the gear 67, thus rotating the shaft 50 of the indexing mechanism. Rotation of the shaft 50 causes the cams 51 and 52 to index the tool support one step as previously described.

As rotation of shaft 50 begins, the pin 56 of switch ILS will be moved inwardly (by the disk 54) opening the upper contacts of the switch and closing the lower contacts thereof. This operation of switch ILS provides a holding circuit for the relay I around the push button 87, since the normally open contacts I–3 have been closed by the previous energization of relay I by operation of the push button 87. The energization of relay I, having opened the normally closed contacts I–7, the electromagnetic brake IB is deenergized so that the previously mentioned rotation of member 101 is not prevented thereby. Also, the energization of relay I has opened and normally closed contact I–4 so that the electromagnetic clutch FC (controlling the reciprocation) cannot be energized during the indexing movement. Furthermore, the energization of relay I has closed the normally opened contacts I–8, energizing the electromagnetic brake FB, through the closed brake switch 85. Hence, the flange portion 99 of sleeve 92 is positively held from rotation so that even the slightest reciprocation of the tool support (which might otherwise occur due to frictional drag between the driving member 91 and the sleeve 92) is prevented. The contacts I–2 and I–6 are provided to prevent inadvertent operation of the push button switches 83 and 84 from effecting the circuit during the indexing operation.

As the shaft 50 completes one revolution, the switch operating disk 54 will be returned to the position indicated in Fig. 7 so that the button or pin 56 of switch ILS again enters the notch 55 in the periphery of the disk, thus reclosing the upper contacts of switch ILS and opening the lower contacts of this switch. This opens the holding circuit for the relay I, deenergizing the latter, and returning the circuit to the condition indicated in Fig. 14 or Fig. 14A, it being remembered that the energization of the motor 58 is also directly controlled by the energization or deenergization of relay I through contacts I–1 thereof, which are in parallel with the push button 83. Upon the return of the circuit to the condition illustrated in Fig. 14 or Fig. 14A, it will be observed that the clutches FC and IC will be deenergized and the two brakes FB and IB will be energized, thus holding the tool support from either further indexing or reciprocating movement until one of the manual push buttons is again operated.

It is believed that the operation of the device, whether employing the power transmission unit of Fig. 11 or that shown in Fig. 13, will now be readily apparent from the above detailed description. Therefore, only a brief summary of the main features of the invention is deemed necessary.

Referring to Fig. 1, it will be seen that upon positioning a workpiece in the spindle 20 (which may then be rotated by conventional means not shown) a plurality of machining operations may be performed thereon, in succession, by tools carried upon the several faces of the tool supporting head 22. Conversely, by supporting a tool in the spindle 20 and different workpieces upon each of the faces of the tool support head 22, a number of different workpieces may be successively operated upon by reciprocation of the said workpiece to and from engagement with the tool in the spindle 20. In either event, the reciprocation and indexing of the tool, or work, support 21 is effected by operation of a single reversible electric motor connected through an electrically controlled power transmission unit to the reciprocating and indexing mechanism for the said tool support.

The power transmission unit, in its broadest aspects, comprises a driving member and two driven members with electromagnetic means for selectively effecting driving relationship between the driving member and either of said driven means, the other of said driven means being then positively held against rotation by electromagnetically effected braking action. These electromagnetic means of the power transmission unit, and the windings of the reversible motor are so interconnected by an electrical circuit that indexing and reciprocation of the tool support may be started manually but are automatically terminated. Moreover, inadvertent operation of indexing or reciprocation cannot be effected when the other of these functions has been intentionally started.

Finally, the mechanical means for indexing and and reciprocating the tool support are both carried by the latter in a novel manner such that the indexing mechanism is automatically disconnected from the tool support during reciprocation of the latter and is automatically reconnected thereto when the tool support has returned to its initial position. This prevents the reciprocating mechanism from interfering with the indexing mechanism, and also prevents indexing of the said support when it is not in the proper position for effecting this operation.

While certain preferred embodiments of the invention have been disclosed, it will be apparent that various modifications, changes and adaptations may be made by those skilled in the art. We, therefore, do not desire to be restricted to the exact constructions and arrangements illustrated and described but consider our invention as limited only by the spirit and scope of the appended claims.

Having thus described our invention, we claim:

1. In an apparatus of the character described, a driving member, two driven members, means including separate electromagnetic means to selectively effect driving of either of said driven members by said driving member, an indexible and reciprocable support adapted to carry a plurality of tools or workpieces, means actuated by one of said driven members to reciprocate said support, means actuated by the other of said driven members to index said support, an electrical circuit for selectively energizing said electromagnetic means, and means in said circuit to prevent energization of the other of said electromagnetic means when one of said electromagnetic means is energized.

2. In an apparatus of the character described, a driving member, two driven members, means including separate electromagnetic means to selectively effect driving of either of said driven members by said driving member, a rotatably indexible and reciprocable support adapted to carry a plurality of tools or workpieces, means actuated by one of said driven members to reciprocate said support, means actuated by the other of said driven members to rotatably index said support, an electrical circuit for selectively energizing said electromagnetic means, means in said circuit to prevent energization of the other of said electromagnetic means when one of said electromagnetic means is energized, and mechanical means for preventing rotation of said tool support while it is being reciprocated.

3. In an apparatus of the character described, a tool support adapted to mount a plurality of tools for successive operations upon a workpiece, means to reciprocate said tool support relative to said workpiece so that a tool may perform an operation thereon, means to rotatably index said tool support to successively bring each of the tools supported thereon into cooperative relationship with said workpiece, a power transmission unit comprising a single driving member, two driven members, and means including separate electromagnetic means to selectively effect driving of either of said driven members by said driving member, driving connections between one of said driven members and the said means to reciprocate said tool support and between the other of said driven members and the said indexing means, an electrical circuit for selectively energizing said electromagnetic means, and means in said circuit to prevent energization of the other of said electromagnetic means when one of said electromagnetic means is energized.

4. An apparatus of the character described in claim 3 and further comprising mechanical means for preventing rotation of said tool support while it is being reciprocated.

5. In an apparatus of the character described, a driving member, two driven members, epicyclic gearing between the driving and driven members, separate electromagnetic means selectively cooperating with said epicyclic gearing to hold different portions of said gearing stationary to thereby effect selective driving of said driven members by said driving member, an indexible and reciprocable support adapted to carry a plurality of tools or workpieces, means actuated by one of said driven members to reciprocate said support, means actuated by the other of said driven members to index said support, an electrical circuit for selectively energizing said electromagnetic means, and means in said circuit to prevent energization of the other of said electromagnetic means when one of said electromagnetic means is energized.

6. In an apparatus of the character described, a tool support adapted to mount a plurality of tools for successive operations upon a workpiece, means to reciprocate said tool support relative to said workpiece so that a tool may perform an operation thereon, means to index said tool support to successively bring each of the tools supported thereon into cooperative relationship with said workpiece, a power transmission unit comprising a single driving member, two driven members, epicyclic gearing between the driving and driven members, and separate electromagnetic means selectively cooperating with said epicyclic gearing to hold different portions of said gearing stationary to thereby selectively hold one of said driven members stationary and effect driving of the other of the driven members by said driving member, driving connections between one of said driven members and the said means to reciprocate said tool support and between the other of said members and the said indexing means, an electrical circuit for selectively energizing said electromagnetic means, and means in said circuit to prevent energization of the other of said electromagnetic means when one of said electromagnetic means is energized.

7. In an apparatus of the character described, a driving member, two driven members, means including a pair of electromagnets adapted to selectively clutch said driving member to one of said driven members, an indexible and reciprocable support adapted to carry a plurality of tools or workpieces, means actuated by one of said driven members to reciprocate said support, means actuated by the other of said driven members to index said support, an electrical circuit for selectively energizing said electromagnets, and means in said circuit to prevent energization of the other of said electromagnets when one of said electromagnets is energized.

8. An apparatus as defined in claim 7 and further comprising a pair of electromagnetic brakes each associated with one of said driven members, the said brakes being connected in the said electrical circuit, and means in said circuit to selectively energize the brake associated with one of said driven members when the clutching electromagnet associated with the other of said driven members is energized.

9. In an apparatus of the character described, a power transmission unit comprising a driving member and two driven members, a reversible electric motor connected with said driving member, means including a plurality of electromagnetic means to selectively provide driving relationship between either of said driven members and the said driving member, and an electrical circuit interconnecting said motor and said electromagnetic means, said circuit including means for selectively energizing said motor to operate in either a forward or reverse direction, means in said circuit to energize one of said electromagnetic means to provide driving relationship between one of said driven members and said driving member whenever the means for selectively energizing said motor is operated to energize the motor for operation in either direction, and means in said circuit to energize the other of said electromagnetic means to provide driving relationship between the other of said driven members and said driving member, the last-named means including means to energize said motor for rotation in one direction only.

10. An apparatus of the character described in claim 9 and further comprising means in said electrical circuit to prevent independent energization of said motor when the said other of said electromagnetic means is energized.

11. In an apparatus of the character described, a driving member, two driven members, means including separate electromagnetic means to selectively effect driving of either of said driven members by said driving member, an indexible and reciprocable support adapted to carry a plurality of tools or workpieces, means actuated by one of said driven members to reciprocate said support, means actuated by the other of said driven members to index said support to successively position each of said tools for a working operation thereby, an electrical circuit for selectively energizing said electromagnetic means, means in said circuit to prevent energization of the other of said electromagnetic means when one of said electromagnetic means is energized, and means to automatically stop reciprocation of said tool support at either extreme of its movement.

12. In an apparatus of the character described, a driving member, two driven members, means including separate electromagnetic means to selectively effect driving of either of said driven members by said driving member, an indexible and reciprocable support adapted to carry a plurality of tools or workpieces, means actuated by one of said driven members to reciprocate said support, means actuated by the other of said driven members to index said support to successively position each of said tools for a working operation thereby, an electrical circuit for selectively energizing said electromagnetic means, means in said circuit to prevent energization of the other of said electromagnetic means when one of said electromagnetic means is energized, and means to automatically stop said indexing means after each successive positioning of a tool thereby.

13. In an apparatus of the character described, a power transmission unit comprising a driving member and two driven members, a reversible electric motor connected with said driving member, means including a pair of electromagnetic means to selectively provide driving relationship between either of said driven members and the said driving member, and an electrical circuit interconnecting said motor and said electromagnetic means, said circuit including means for selectively energizing said motor to operate in either a forward or reverse direction, means in said circuit to energize one of said electromagnetic means to provide driving relationship between one of said driven members and said driving member whenever the means for selectively energizing said motor is operated to effect operation of the motor in either direction, means in said circuit to energize the other of said electromagnetic means to provide driving relationship between the other of said driven members and said driving member, the last-named means including means to energize said motor for rotation in one direction only, and means in said circuit to simultaneously energize both of said electromagnetic means when said motor is deenergized.

14. In an apparatus of the character described, a driving member, two driven members, means including separate electromagnetic means to selectively effect driving of either of said driven members by said driving member, a shaft mounted for rotation and reciprocation, a tool support adapted to carry a plurality of tools mounted on said shaft, a non-rotatable member journalled on said shaft, means on said shaft to prevent movement of said non-rotatable member lengthwise of said shaft, means interconnecting said non-rotatable member and one of said driven members to reciprocate said shaft and support, means carried by said shaft and actuated by the other of said driven means for rotating said shaft and support to successively position each of said tools for a working operation thereby, an electrical circuit for selectively energizing said electromagnetic means, and means in said circuit to prevent energization of the other of said electromagnetic means when one of said electromagnetic means is energized.

15. In an apparatus of the character described, a driving member, two driven members, means including separate electromagnetic means to selectively effect driving of either of said driven members by said driving member, a shaft mounted for rotation and reciprocation, a tool support adapted to carry a plurality of tools mounted on said shaft, means interconnecting said shaft and one of said driven members to reciprocate said shaft and support, means carried by said shaft and selectively connectible with the other of said driven members to rotate said shaft and support to successively position each of said tools for a working operation thereby, said connectible means being connected with the other of said driven members only when said shaft and tool support are at one extreme of their reciprocating movement, an electrical circuit for selectively energizing said electromagnetic means, and means in said circuit to prevent energization of the other of said electromagnetic means when one of the said electromagnetic means is energized.

16. An apparatus of the character described in claim 15 and further comprising mechanical means to prevent rotation of said tool support and shaft while it is being reciprocated whereby said connectible means remains aligned for engagement throughout the reciprocation of said shaft and tool support.

17. In an apparatus of the character described, a driving member, two driven members, means including separate electromagnetic means to selectively effect driving of either of said driven members by said driving member, a shaft mounted for rotation and reciprocation, a tool support adapted to carry a plurality of tools mounted on said shaft, means interconnecting said shaft and one of said driven members to reciprocate said shaft and support, a disk having an opening adjacent its periphery, means to rotatably journal said disk coaxially with said shaft, means interconnecting said disk and the other of said driven means, a member connected with said shaft for rotation therewith, and a pin mounted in the last-named member and projecting therefrom for engagement in the opening in said disk when the shaft is in one extreme position, whereby driving the other of said driven members will rotate said disk and index the tool support when the said pin is engaged in the opening of the disk.

18. An apparatus of the character defined in claim 17 and further comprising means to prevent rotation of said tool support while it is being reciprocated, whereby the said pin will at all times remain in alignment with the opening in said disk.

19. In an apparatus of the character described, a driving member, two driven members, means including separate electromagnetic means to selectively effect driving of either of said driven members by said driving member, an indexible and reciprocable support adapted to carry a plurality of tools or workpieces, means actuated by one of said driven members to reciprocate said support, means actuated by the other of said driven members to index said support, an electrical circuit for selectively energizing said electromagnetic means, means in said circuit to prevent energization of the other of said electromagnetic means when one of said electromagnetic means is energized, and means in said circuit to simultaneously energize both of said electromagnetic means to prevent driving of either of said driven members.

20. In an apparatus of the character described, a driving member, two driven members, means including a pair of electromagnets adapted to selectively clutch said driving member to one of said driven members, an indexible and reciprocable support adapted to carry a plurality of tools or workpieces, means actuated by one of said driven members to reciprocate said support, means actuated by the other of said driven members to index said support, an electrical circuit for selectively energizing said electromagnets, means in said circuit to prevent energization of the other of said electromagnets when one of said electromagnets is energized, an electromagnetic brake associated with each of said driven means to effect braking and holding action thereon, said electromagnetic brakes being connected in said electrical circuit, means in said circuit to selectively energize the brake associated with one of said driven members when the clutching electromagnet associated with the other of said driven members is energized, and means in said circuit to simultaneously energize both of said electromagnetic brakes to prevent driving of either of said driven members.

MYRON S. CURTIS.
HARRY SCHOEPE.

REFERENCES CITED

The following references are of record in the file of this patent:

UNITED STATES PATENTS

| Number | Name | Date |
| --- | --- | --- |
| 436,072 | Baldwin | Sept. 9, 1890 |
| 944,497 | Pearson et al. | Dec. 28, 1909 |
| 1,040,751 | Potter | Oct. 8, 1912 |
| 1,083,987 | Chapman | Jan. 13, 1914 |
| 1,109,843 | Jann | Sept. 8, 1914 |
| 1,217,059 | Pollard | Feb. 20, 1917 |
| 1,317,766 | Thomas et al. | Oct. 7, 1919 |
| 1,484,604 | Chapman | Feb. 19, 1924 |
| 2,189,558 | Baxter | Feb. 6, 1940 |
| 2,382,482 | Henry | Aug. 14, 1945 |
| 2,453,120 | Curtis | Nov. 9, 1948 |